(12) United States Patent
Barda et al.

(10) Patent No.: US 9,961,008 B2
(45) Date of Patent: May 1, 2018

(54) METHOD AND SYSTEM OF HANDLING OVER ROUTING OF COMMUNICATION PROTOCOL DATA BETWEEN TWO SATELLITE COMMUNICATION TRANSPONDERS

(71) Applicant: Ayecka Communication Systems, Kfar Saba (IL)

(72) Inventors: Avraham Barda, Hod HaSharon (IL); Baruch Kagan, Kiryat Ono (IL); Igal Gerzberg, Netanya (IL)

(73) Assignee: AYECKA COMMUNICATION SYSTEMS, Kfar Saba (IL)

( * ) Notice: Subject to any disclaimer, the term of this patent is extended or adjusted under 35 U.S.C. 154(b) by 290 days.

(21) Appl. No.: 14/945,561

(22) Filed: Nov. 19, 2015

(65) Prior Publication Data
US 2017/0149677 A1 May 25, 2017

(51) Int. Cl.
*H04L 12/875* (2013.01)
*H04L 12/833* (2013.01)
*H04W 36/18* (2009.01)
*H04W 56/00* (2009.01)
*H04W 84/06* (2009.01)

(52) U.S. Cl.
CPC .............. *H04L 47/56* (2013.01); *H04L 47/31* (2013.01); *H04W 36/18* (2013.01); *H04W 56/0045* (2013.01); *H04W 84/06* (2013.01)

(58) Field of Classification Search
CPC ................... H04B 7/18578; H04W 84/06; H04W 56/004; H04W 36/18
See application file for complete search history.

(56) References Cited

U.S. PATENT DOCUMENTS

| | | | |
|---|---|---|---|
| 2002/0003790 A1* | 1/2002 | Heppe | H04B 7/0802 370/338 |
| 2002/0072332 A1* | 6/2002 | Chang | H01Q 1/007 455/430 |

(Continued)

*Primary Examiner* — Khaled Kassim
*Assistant Examiner* — Syed S Ali
(74) *Attorney, Agent, or Firm* — Browdy and Neimark, PLLC (57) ABSTRACT

The present invention provides a system for handling handover of communication protocol data between two satellite transponder, wherein the satellite transponders are moving in orbit around the earth, enabling to transmit communication protocol data between at least one gateway and terminal. The system is comprised of: at least one transmitter associated with a gateway, at least one de-modulator associated with the terminal a for controlling the packet transmission during handover period, wherein the system is programmed to achieve a seamless hand over process between the two satellites transponders by controlling the transfer and reception of the communication protocol packets during the handover period, by synchronizing the last received packets from the setting satellite packets with first received packets from the rising satellite, wherein seamless handover include maintaining the correct packet order, avoiding packet loss and preventing packet duplication and wherein in case the rising satellite having shorter path, the receipt or transmission of the communication protocol packets from the rising satellite is delayed.

27 Claims, 7 Drawing Sheets

(56) References Cited

U.S. PATENT DOCUMENTS

| | | | |
|---|---|---|---|
| 2002/0072389 A1* | 6/2002 | Ward | H04B 7/18567 455/552.1 |
| 2002/0123343 A1* | 9/2002 | Wiedeman | H04B 7/18513 455/429 |
| 2004/0090935 A1* | 5/2004 | Courtney | H04W 36/12 370/331 |
| 2012/0213150 A1* | 8/2012 | Oguz | H04W 72/1215 370/328 |
| 2013/0293414 A1* | 11/2013 | Robinson | G01S 19/05 342/357.25 |
| 2014/0010154 A1* | 1/2014 | Hong | H04B 7/10 370/328 |
| 2015/0103723 A1* | 4/2015 | Kim | H04W 4/06 370/312 |
| 2016/0183145 A1* | 6/2016 | Chintada | H04B 7/18578 370/331 |
| 2016/0295496 A1* | 10/2016 | Atarius | H04W 8/005 |
| 2017/0041850 A1* | 2/2017 | Benammar | H04W 36/30 |
| 2017/0105153 A1* | 4/2017 | Ashrafi | H04B 17/336 |
| 2017/0374596 A1* | 12/2017 | Benammar | H04W 36/30 |

* cited by examiner

METHOD AND SYSTEM OF HANDLING OVER ROUTING OF COMMUNICATION PROTOCOL DATA BETWEEN TWO SATELLITE COMMUNICATION TRANSPONDERS

BACKGROUND

Technical Field

The present invention generally relates to the handling handover of communication protocol data between two satellite transponders and more particularly synchronizing and controlling the transferring and receipt of the communication protocol packets during the handover period between two satellites.

Discussion of Related Art

In the modern world of telecommunications, the concept of wireless data network global coverage is vital. Real time data global coverage can be achieved mainly by satellite systems. The development of satellite networks which enable real time wireless coverage requires considering the different orbiting cycles of the satellites. The need is to provide a solution for real time continuous wireless coverage of satellite networks without losing too many packets during switching periods between satellites.

U.S. Pat. No. 6,157,621 discloses a Satellite Communication System of a dynamic constellation (C) of satellites capable of offering continuous voice, data and video service to customers across the globe on the land, on the sea, or in the air. The invention comprises a low Earth orbit satellite system that includes 40 spacecraft (S) traveling in each of 21 orbital planes at an altitude of 700 km (435 miles). This relatively large number of satellites employed by the invention was selected to provide continuous coverage of the Earth's surface at a high minimum mask angle (1230a) of forty degrees. Each of the individual 840 spacecraft (S) functions as an independent sovereign switch of equal rank which knows the position of its neighbors, and independently handles traffic without ground control. The satellites (S) are capable of transporting calls to millions of customers using portable (P), mobile (M) and fixed (F) residential and business terminals, and gateways (G) to public phone networks.

U.S. Pat. No. 6,298,073, discloses a method for fixing the propagation delay between a user terminal and another station in a non-synchronous LEO satellite communications system, to adjust plural signals to have substantially similar times-of-arrival, uses an elastic buffer to insert a variable delay in the received signal processing, so as to cause a fixed time for each data/vocoder bit, from the time that bit enters the transmit modulation process until the time that same data/vocoder bit is output to a user.

BRIEF SUMMARY

The present invention provides a system for handling handover of communication protocol data between two satellite transponder, wherein the satellite transponders are moving in orbit around the earth, enabling to transmit communication protocol data between at least one gateway and terminal. The system is comprised of:
at least one transmitter associated with a gateway;
at least one de-modulator associated with the terminal a for controlling the packet transmission during handover period,
wherein the system is programmed to achieve a seamless hand over process between the two satellites transponders by controlling the transfer and reception of the communication protocol packets during the handover period, by synchronizing the last received packets from the setting satellite packets with first received packets from the rising satellite;
wherein seamless handover include maintaining the correct packet order, avoiding packet loss and preventing packet duplication;
wherein in case the rising satellite having shorter path, the receipt or transmission of the communication protocol packets from the rising satellite is delayed.

According to some embodiments of the present invention the further comprising a packet tagging module for associating identifying number to each packet.

According to some embodiments of the present invention wherein the delay is performed at one demodulator;

According to some embodiments of the present invention the system includes one demodulator wherein the delay is performed at the transmitter;

According to some embodiments of the present invention
In case the rising satellite having shorter path, postponing the transfer of the first transferred packets from the rising satellite during handover period until last received packets from the setting satellite packets are synchronized with first received packets from the rising satellite;

According to some embodiments of the present invention in case of rising satellite having longer path then gradually disregarding packets already received for synchronizing the timing of received packets from both satellites transponders.

According to some embodiments of the present invention the system further comprising:
At least one packet encapsulate for encapsulating communication protocol packets;
At least two de-modulators associated with the terminal; and
At least two de-encapsulators associated with the terminal
wherein the packet tagging module insert a counter serial number in the encapsulated packet header at timestamp field.

According to some embodiments of the present invention the system further comprising at least one arbitrator associated with demodulator having a buffer memory associated with the terminal, wherein the arbitrator is programmed to synchronize the hand over between the two satellites transponders by tracking the communication protocol packets sequential value, by applying the steps of:
In case the rising satellite having shorter path, the receipt of the communication protocol packets from this satellite is delayed by:
buffering the packets at the rising satellite demodulator, until the packet number is smaller by one than the last packet received from the setting satellite; and
retrieving the packets from the buffer of the rising satellite, and stop reception of packets from the setting satellite, packets are received only from the rising satellite;
In case of rising satellite having longer path, the delay is created by stop reception of packets from the setting satellite, packets are received only from the rising satellite remembering last packet number received from the setting satellite transponders and waiting till the number of the packet of the rising satellite transponders reach the remembered last packet.

According to some embodiments of the present invention the packet encapsulator is a GS packet encapsulator performing at the GSE communication level.

According to some embodiments of the present invention the arbitrator can control the rate it is outputting packets from its internal memory to the network interface;

According to some embodiments of the present invention the output rate of the arbitrator to the network can be adjusted to perform a linear regulation of the output packet rate, according to the measured delay between packets arriving from setting satellite to packets arriving from rising satellite.

According to some embodiments of the present invention the output rate from the arbitrator internal memory to the network interface is always constant and matches the nominal link rate, or the nominal link rate plus some small delta.

According to some embodiments of the present invention the buffer is acting as an elastic buffer to automatically adjust between the variable input rate from setting satellite and/or rising satellite to the constant output rate.

According to some embodiments of the present invention the elastic buffer can be implemented in one of the following places in the receiver chain: I/Q output of demodulator part, BBFrame output of decoder part, TS output of decoder part, communication protocol packets at the output of de-encapsulation part According to some embodiments of the present invention the delay in packet arrival delay at the modulator is known and can be calculated.

According to some embodiments of the present invention in case packet arrival delay at the modulator cannot be calculated it is assigned a maximum value.

According to some embodiments of the present invention said receiving antenna has fast switching time between the setting and the rising satellite.

According to some embodiments of the present invention this switching is triggered by loss of lock of the receiver.

According to some embodiments of the present invention this switching is triggered by time schedule calculated according to the location and accurate time source.

The present invention provides a method for handling handover of communication protocol data between two satellite communication transponders, wherein the satellite communication transponders are moving in orbit around the earth, enabling to transmit IP data between at least a gateway associated with at least one transmitter and terminal associated with at least one modulator. The method comprising the steps of controlling the packet transmission during handover period, achieve a seamless hand over process between the two satellites transponders by controlling the transfer and reception of the communication protocol packets during the handover period, by synchronizing the last received packets from the setting satellite packets with first received packets from the rising satellite.

According to some embodiments of the present invention the seamless handover include maintaining the correct packet order, avoiding packet loss and preventing packet duplication;

According to some embodiments of the present invention in case the rising satellite having shorter path, the receipt or transmission of the communication protocol packets is delayed.

According to some embodiments of the present invention the delay is performed at the transmitter and the synchronizing include:

In case the rising satellite having shorter path, the postponing the transfer of last transferred packets from the rising satellite during handover period until last received packets from the setting satellite packets are synchronized with first received packets from the rising satellite;

In case of rising satellite having longer path, the delay is created by stop sending out packets from the setting satellite, packets from the rising satellite are received after predefined delay, for synchronizing the timing of received packets from both satellites.

According to some embodiments of the present invention the delay is performed at the demodulator further comprising the step of tagging IP packets.

inserting counter serial number in the encapsulated packet header at timestamp field.

According to some embodiments of the present invention the tagging is performed at the GSE level.

According to some embodiments of the present invention the method further comprising the step synchronizing the hand over between the two satellites by tracking the communication protocol packets counter serial number, wherein In case the rising satellite having shorter path, the receipt of the communication protocol packets is delayed by buffering the packets received from rising satellite until the packet number is smaller by one than the packet number in the buffer obtained from the setting satellite, then transfer packets from the buffer, stop sending out packets from the setting satellite, and continue to receive packets from the rising satellite.

According to some embodiments of the present invention, in case of rising satellite having longer path then gradually disregarding packets already received for synchronizing the timing of received packets from both satellites transponders.

BRIEF DESCRIPTION OF THE DRAWINGS

The present invention will be more readily understood from the detailed description of embodiments thereof made in conjunction with the accompanying drawings of which.

DETAILED DESCRIPTION

Before explaining at least one embodiment of the invention in details, it is to be understood that the invention is not limited in its application to the details of construction and the arrangement of the components set forth in the following description or illustrated in the drawings. The invention is applicable to other embodiments and/or may be practiced or carried out in various ways. Also, it is to be understood that the phraseology and terminology employed herein is for the purpose of description and should not be regarded as limiting.

For a better understanding of the invention, the usages of the following terms in the present disclosure are defined in a non-limiting manner:

The term "arbitrator" as used herein in this application, is defined as firmware, hardware or software module for controlling packet transmission routing.

The term "modulator" as used herein in this application, is defined as a communication device, receiving data to be transmitted over a channel, and modulating a carrier wave with this data.

The term "encapsulator" as used herein in this application, is defined as module for inclusion of one data structure within another structure so that the first data structure is hidden for the time being.

GS encapsulation (GSE) refers to packing of GS Protocol GS is an encapsulation protocol providing greater supports for communication protocol data transmission with respect to other older methods. The protocol gives up the format of fixed length TS (transport stream) data packet and uses the format of variable length packet. Moreover, GSE maps directly to the physical layer transmission. GSE header has a fixed length of 4 Byte. The remaining fields are optional fields. Therefore, the encapsulation process is more simple and flexible.

Generic Stream Encapsulation, or GSE for short, is a Data link layer protocol defined by DVB. GSE provides means to carry packet oriented protocols such as IP on top of uni-directional physical layers such as DVB-S2, DVB-T2 and DVB-C2.
(https://en.wikipedia.org/wiki/Generic_Stream_Encapsulation)

The present invention disclose a system for and method for handling handover of communication protocol (Such as IP, VPN, Ethernet protocol, Cellular protocols) data between two satellite transponders (optionally satellite stations), wherein the satellite transponders are orbiting around the earth, enabling to transmit communication protocol data between at least a gateway and terminal.

According to some embodiments of the present invention, the system is comprised of: at least one transmitter and at least one modulator and one de-demodulator, for controlling the packet transmission during handover period, the system is programmed to achieve a seamless hand over process between the two satellites transponders by controlling the transferring and receipt of the communication protocol packets during the handover period, by synchronizing last received packets from the setting satellite packets with first received packets from the rising satellite: the method generally define the following use case: logic:

in case the rising satellite having shorter path, the receipt or transmission of the communication protocol packets is delayed at the demodulator, arbitrator or transmitter of the rising satellite;

In case the rising satellite having longer path, creating delay at receipt of the communication protocol packets from the rising satellite transponders.

The seamless handover include maintaining the correct packet order, avoiding packet loss and preventing packet duplication.

According to some embodiments of the present invention the synchronization process of delaying packets transmission may be performed at the reception path (demodulator), following the logic:

In case the rising satellite having shorter path, the receipt of the communication protocol packets from this satellite is delayed by buffering the packets at the rising satellite demodulator or arbitrator, until the packet number obtained from the setting satellite is smaller by one than the first packet number in the rising satellite buffer, then retrieving the packets from the buffer of the rising satellite, and stop reception of packets from the setting satellite, following packets are received only from the rising satellite;

In case of rising satellite having longer path, the delay is created by stop reception of packets from the setting satellite, packets are received only from the rising satellite remembering last packet number received from the setting satellite transponders, waiting till the number of the packet of the rising satellite transponders reach the remembered last packet According to some embodiments of the present invention the synchronization process of delaying packets transmission may be performed at the transmitter.

Figure 1A:
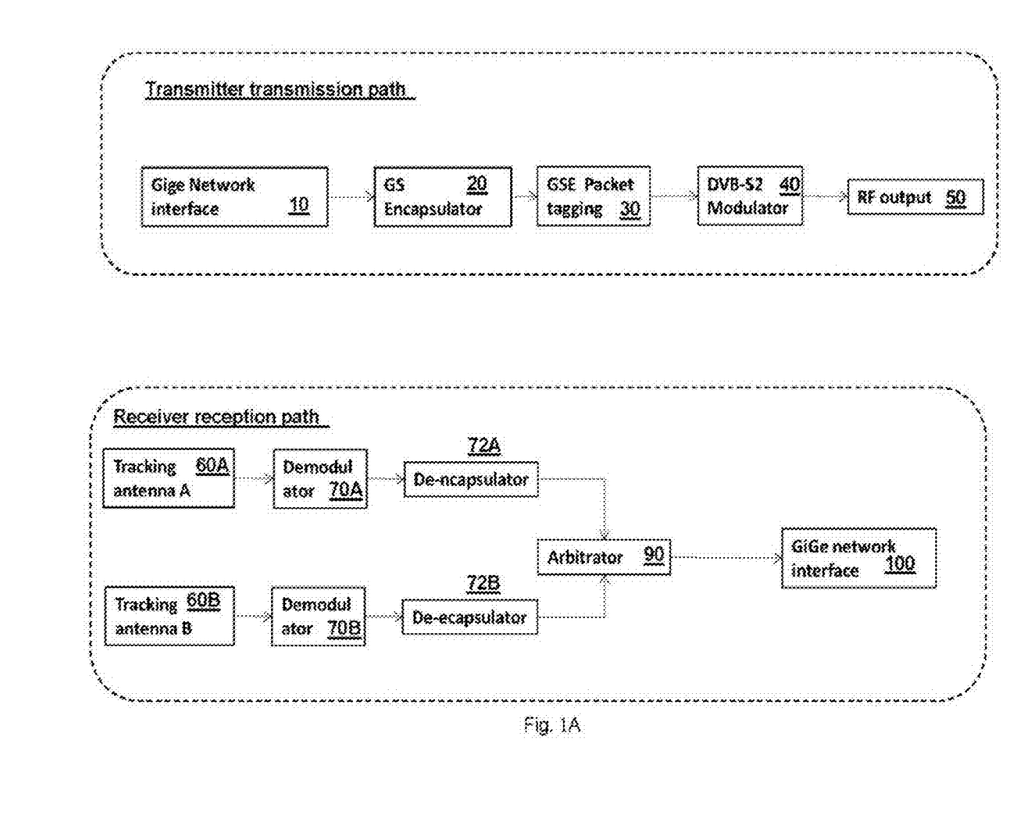
FIG. 1A is a block diagram illustrating a the communication elements in transmission and reception paths, according to some embodiments of the invention.

FIG. 1A is a block diagram illustrating the communication elements in transmission and reception paths, according to some embodiments of the invention. According to one embodiment of the present invention the GS Encapsulator 20 at the transmitter (transmission path), receives communication protocol data from the Gige Network interface 10 and encapsulates each packet. The packet tagging can be pre-formed at communication protocol level or GSE level or any other level. The packet tagging 40 is done by adding serial number to each encapsulated packet at the GSE or communication protocol level. The encapsulated and tagged packet is then modulated by the modulator 50 and transmitted by RF 60.

At the reception path the data packets are received by at least one tracking antenna (60A, 60B), demodulated by demodulator 70 A and 70 B), packet data are de-capsulated to retrieve the raw data, the raw data is processed by the arbitrator 90 as is further explained bellow.

According to some embodiments only one tracking antenna may be used, using two movable or stationary LNB (feeding units) and two corresponding modulators. Optionally modems are moving in front of the reflector.

Figure 1B:
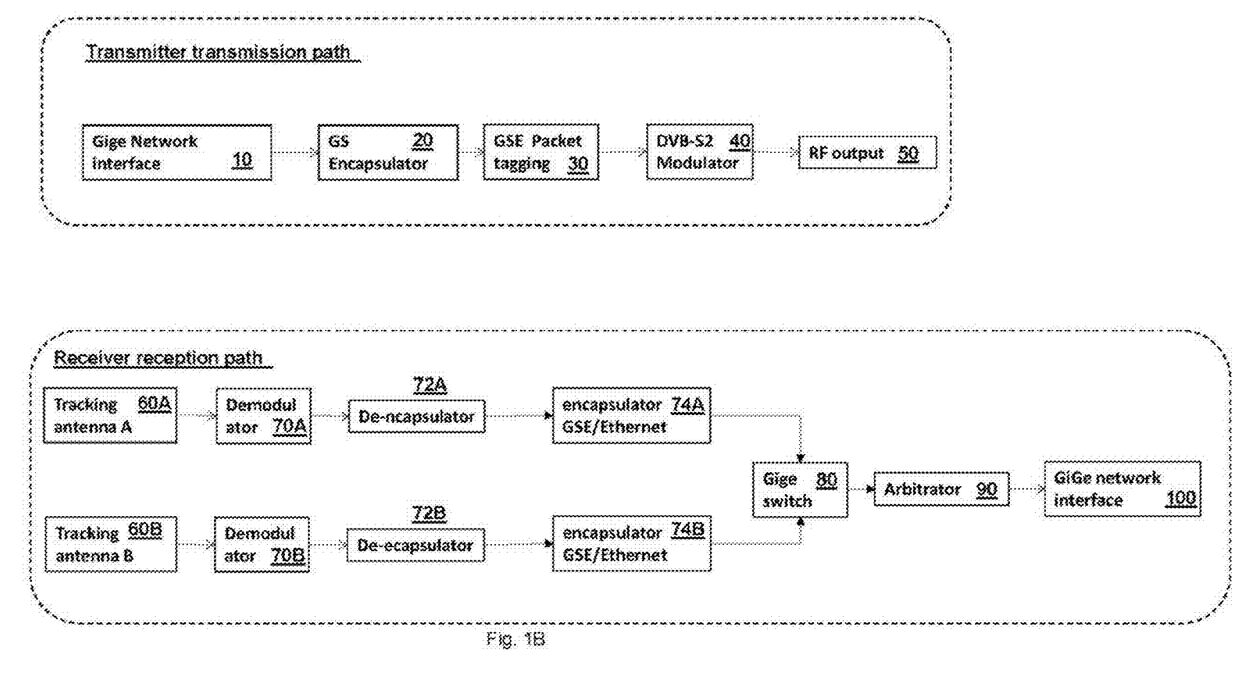
FIG. 1B is a block diagram illustrating a the communication elements in transmission and reception paths, according to other embodiments of the invention.

FIG. 1B is a block diagram illustrating the communication elements in transmission and reception paths, according to other embodiments of the invention.

According to second embodiment of the present invention the GSE Encapsulator 20 at the at the transmitter (transmission path), receives communication protocol data from the Gige Network interface 10 and encapsulate each packet, the tagging can be pre-formed at communication protocol level or GSE level, the packet tagging 30 add serial number to each encapsulated packet. The encapsulated packet is modulated by the modulator 40 and transmitted by RF 50.

At the reception path the packets are received by at least one tracking antenna (60A, 60B), demodulated by demodulator 70 (A, B), packet data are de-encapsulated to retrieve the raw data, the raw data is re encapsulated by encapsulator GSE/Ethernet (74, B) to be transmitted through Gige switch 80 to processed by the arbitrator 90 as will be further explained bellow.

Figure 1C:
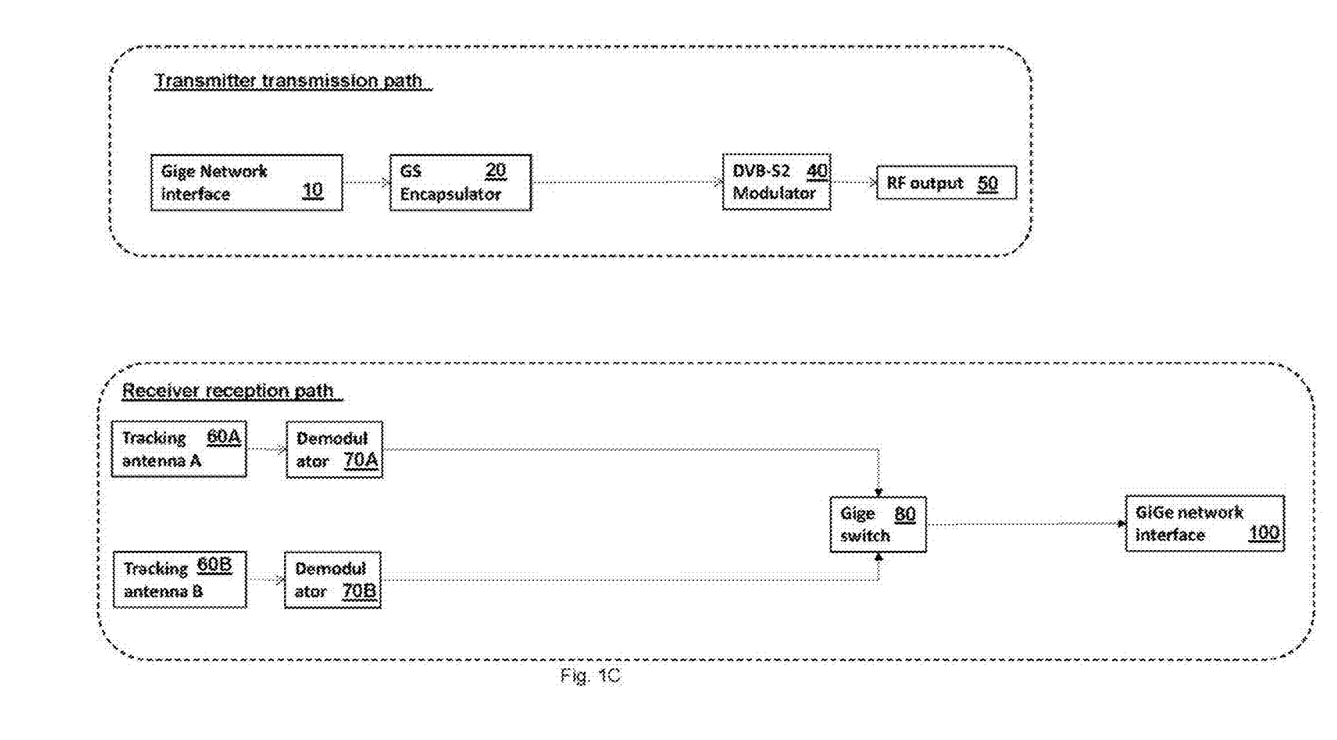
FIG. 1C is a block diagram illustrating a the communication elements in transmission and reception paths, according to other embodiments of the invention.

FIG. 1C is a block diagram illustrating the communication elements in transmission and reception paths, according to other embodiments of the invention.

According to third embodiment of the present invention, the modulator 40 receives routing data from the Gige Network interface to be modulated. Optionally the modulator delays the transfer of the packets (as explained in FIG. 2A) and transmitted by RF 50.

Figure 2A:
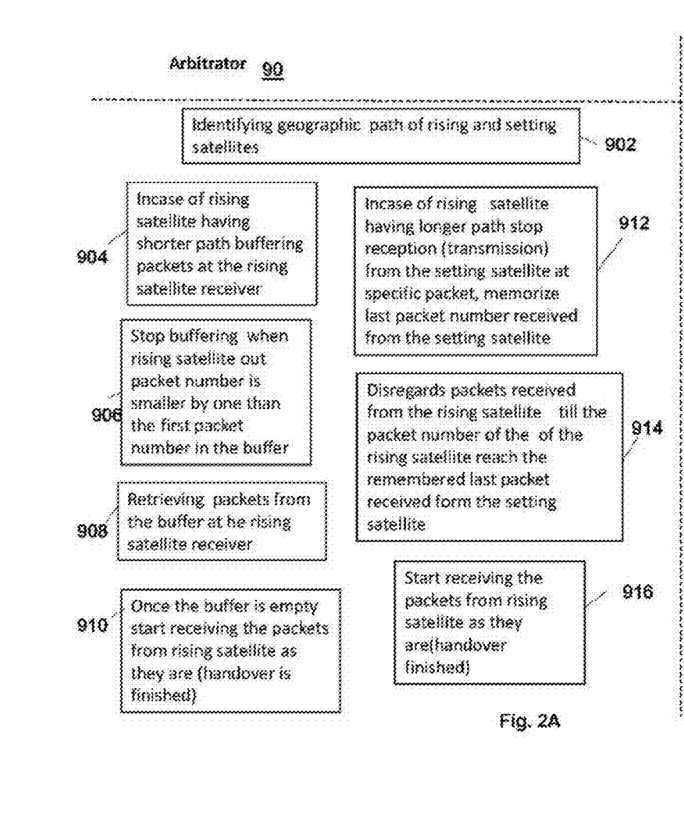
FIG. 2A is a flowchart illustrating a process of handling over routing of communication protocol data at the arbitrator, according to some embodiments of the invention.

At the reception path the data packets are received by at least one tracking antenna (60A, 60B), demodulated by demodulator 70 A and 70 B) which optionally delay the transfer of the packets as explained in FIG. 2A.

Figure 3:
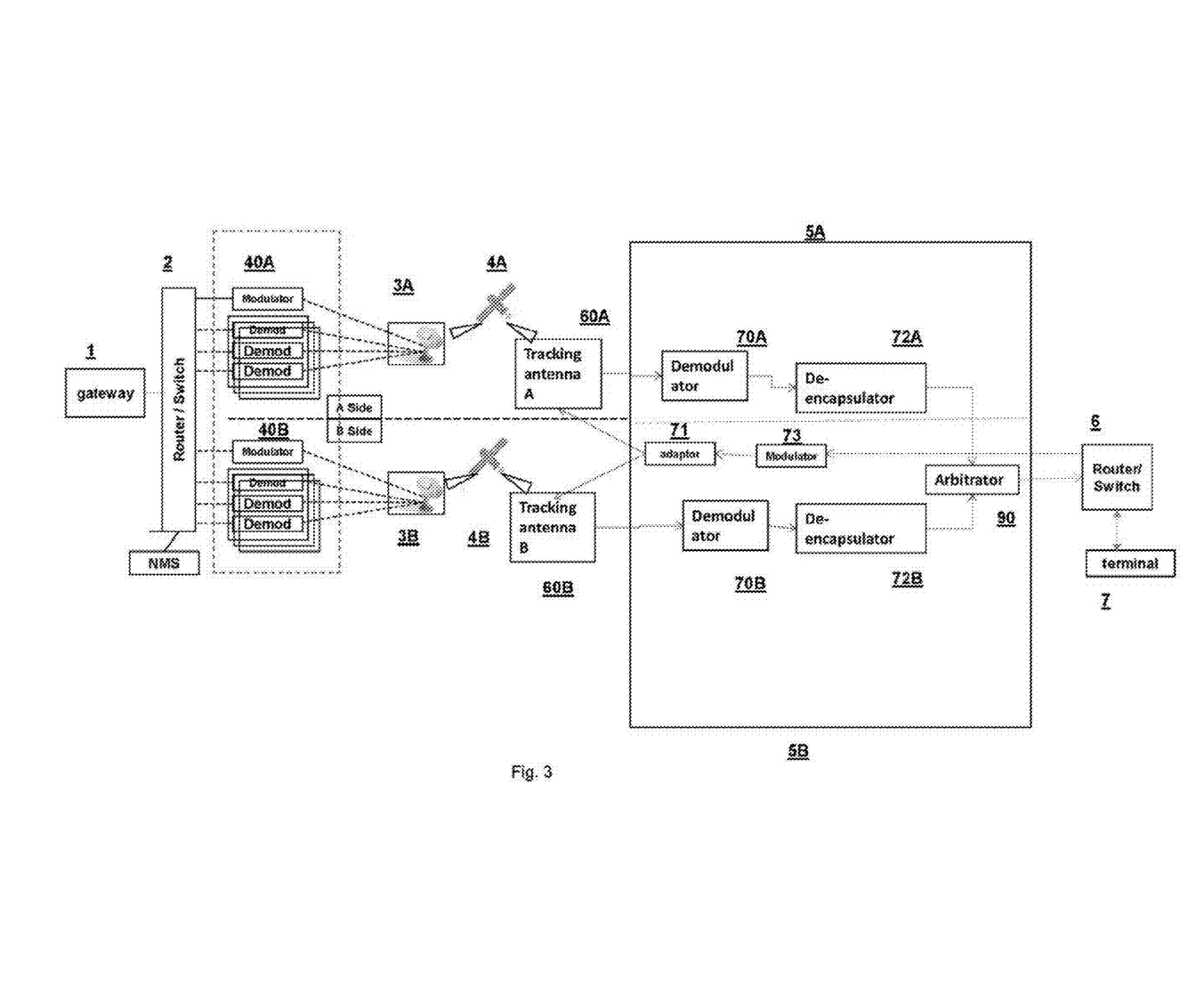
FIG. 3 is a block diagram illustrating a the communication elements in transmission and reception paths, according to some embodiments of the invention.

According to some embodiments of the present invention the use case logic in implemented (using the configuration as illustrated in FIG. 3) as follows:

In case the rising satellite having shorter path, the receipt of the communication protocol packets in the demodulator is delayed at the rising satellite path, until all the prior packets are received from the setting satellite, by gradually postponing the transfer of first received packets from the rising satellite during handover period, such as last received packets from the setting satellite packets are synchronized with first received packets from the rising satellite.

In case of rising satellite having longer path, the delay is created at demodulator by stop/denying reception of packets from the setting satellite at a specific point, disregard packets received from the rising satellite till the packet number of the rising satellite reach the remembered last packet received form the setting satellite transponders. Optionally, instead of stopping the reception of packets, decrease packet output reception rate from setting satellite to create a more swift transition. For example if there is gap of Ng bits, the next Nt bits are transmitted in period of (Nt_Ng)_*T (wherein T is the transmission time of one bit), for synchronizing the timing of received packets from both satellites;

According to some embodiments of the present invention the synchronization process of delaying packets transmission may be performed at the transmitter using the following logic:

In case the rising satellite having shorter path, the postponing the transfer of last transferred packets from the rising satellite during handover period until last received packets from the setting satellite packets are synchronized with first received packets from the rising satellite;

In case of rising satellite having longer path then gradually disregarding packets already received for synchronizing the timing of received packets from both satellites transponders, (or advance the transmission of packets from the rising satellite transponders).

FIG. 2A is a flowchart illustrating a process of handling over routing of communication protocol data at the arbitrator, according to some embodiments of the invention. The arbitrator 90, is configured perform the flowing steps:

Optionally Identifying geographic path of rising and setting satellites (step 902)
In case of rising satellite having shorter path, buffering packets at the rising satellite (step 904)
Stop buffering when setting satellite out packet number is smaller by one than the first packet number in the buffer of the rising satellite. (step 906)
Retrieving packets from the buffer at the rising satellite demodulator (step 908)
Once the buffer is empty, start receiving the packets from rising satellite as they are (handover is completed) (step 910)

In case of rising satellite having longer path, stop/denying reception of packets from the setting satellite at specific packet, remember last packet number received from the setting satellite transponders (step 912);

Disregards packets received from the rising satellite till the packet number of the of the rising satellite reach the remembered last packet received form the setting satellite (step 914);
Begin receiving the packets from rising satellite as they are (handover is completed) (step 916)

The tagging process may be implemented in different logical or physical communication layers of the satellite communication path such as DVB-S2, DVB-T2 or DVB-C2. The tagging may be implemented using Baseband Frame (DVB-S2-BB) header or GSE header as further detailed bellow.

Figure 2B:
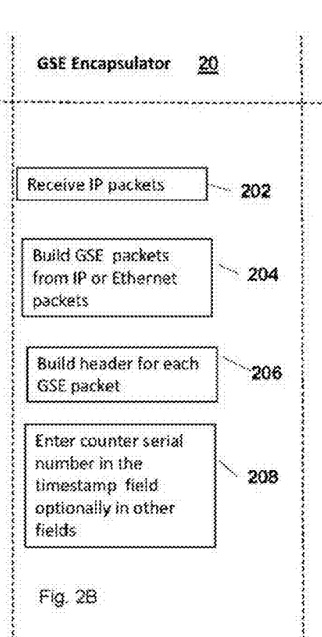
FIG. 2B is a flowchart illustrating a process of handling handover of communication protocol data at the GSE Encapsulator, according to some embodiments of the invention.

FIG. 2B is a flowchart illustrating a process of handling over routing of communication protocol data at the GS Encapsulator, according to some embodiments of the invention. The GS Encapsulator 20, perform at least one of flowing steps:

Receiving communication protocol packets (step 202);
Building GSE packets from communication protocol such as IP or Ethernet packets (step 204)
Building header for each GSE packet (step 206)
Entering sequential value, such as counter serial number in the in one of the fields of the packet, in the header, payload, trailer of the packet. For example a serial number can be inserted in the timestamp field or using Ethertype when using Ethernet protocol (step 208)

Figure 2C:
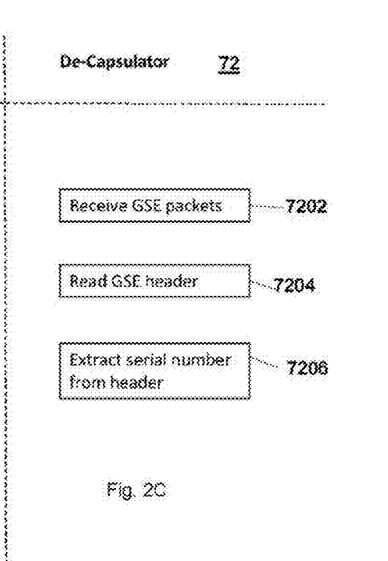
FIG. 2C is a flowchart illustrating a process of handling handover of communication protocol data at the De-encapsulator, according to some embodiments of the invention.

FIG. 2C is a flowchart illustrating a process of handling over routing of communication protocol data at the De-Capsulator, according to some embodiments of the invention. The De-Capsulator 72, perform
at least one of the flowing steps:
Receive GSE packets (step 7202);
Read GSE header (step 7204);
Extract serial number from header (step 7206);

FIG. 3 is a block diagram illustrating the communication elements in transmission and routing process, according to some embodiments of the invention. The communication protocol data is transmitted between a gateway 1 and terminal 7: At the transmitting path, the router 2 conveys the communication protocol data using modulators 40A, 40 B and transmitting antennas 3A, 3B through satellites transmitter transponder 4A, and 4B. At the reception path: The communication protocol data is received at tracking antennas 60A and 60B to demodulator 5 for modulating the communication protocol data using a router switch 6 to arrive at terminal 7.

Figure 4:
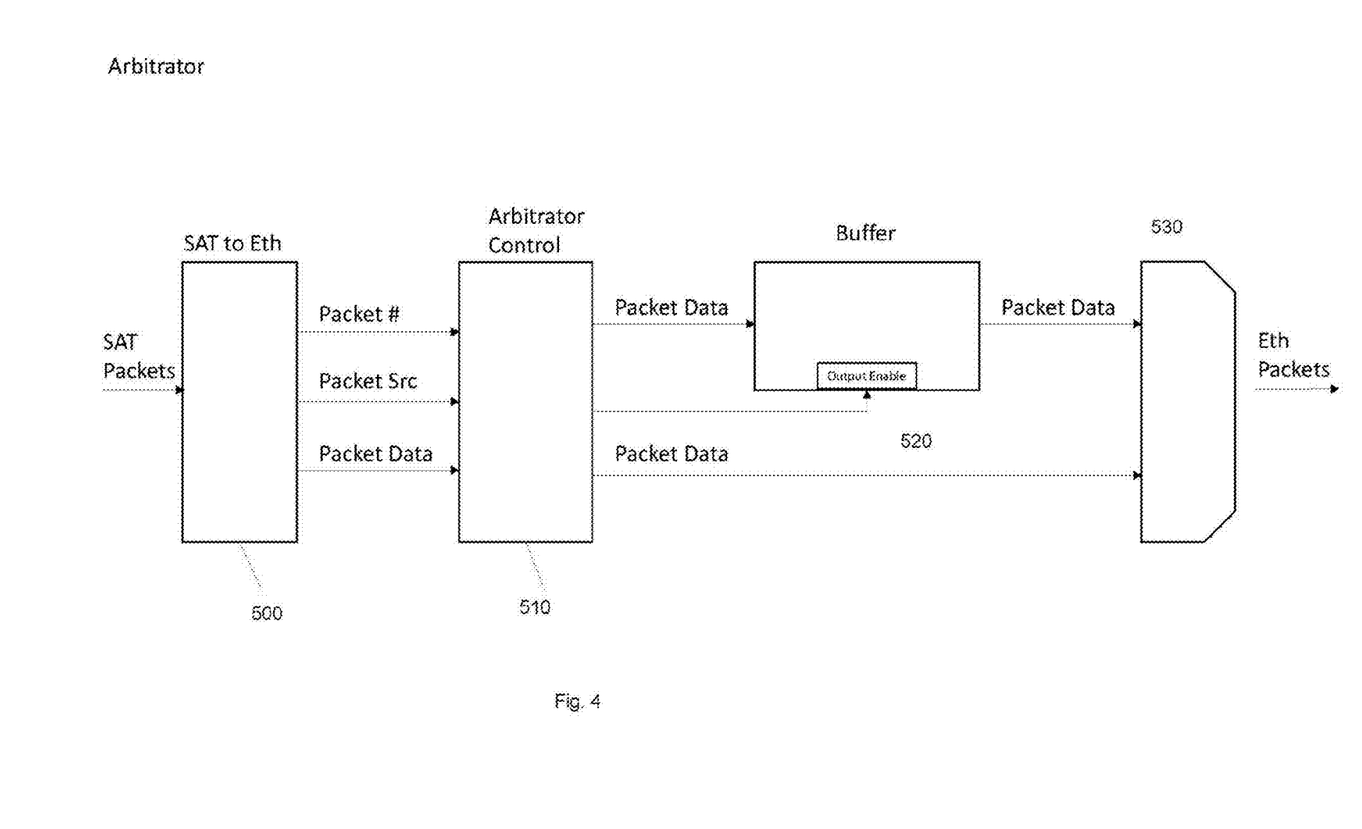
FIG. 4 is a flowchart illustrating flow packets through the handling handover of communication protocol data using arbitrator, according to some embodiments of the invention.

FIG. 4 is a flowchart illustrating the packets flow through the handling over routing of communication protocol data using arbitrator, according to some embodiments of the invention. The data packets are received by the "SAT to Eth" module 500 and are handled by the Arbitrator Control 510, which receive the packet number, source (satellite), and packet data for determining if the data packet is delivered straight to output module 530, or through the buffer 520 according to the routing algorithm described in FIG. 2A. The controller determines at what data packet to start buffering and at which packet number to release (output enable) the buffer content to the "output" module 530.

Figure 5:
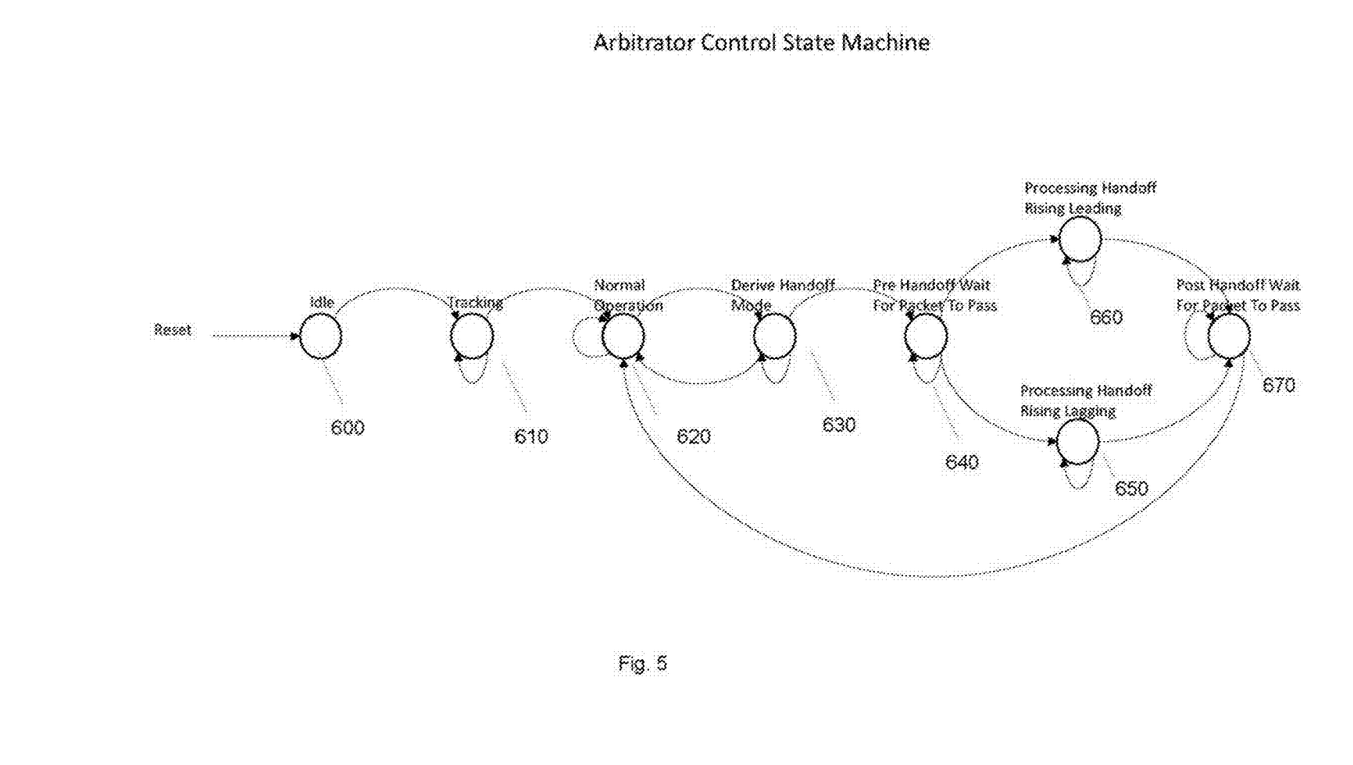
FIG. 5 is a flowchart illustrating arbitrator state machine, according to some embodiments of the invention.

FIG. 5 is a flowchart illustrating arbitrator state machine, according to some embodiments of the invention. The arbitrator starts in idle mode 600, tracking the incoming packets 610, in the normal state 620, once handoff scenario is identified the arbitrator has two processing options: processing hand off of the rising satellite leading (having shorter path) 660 or processing handoff of the rising satellite lagging (having longer path) 650. Once the handoff is over the arbitrator is in waiting mode 670, waiting for the packets to pass, then returning to normal mode.

According to some embodiments of the present invention the determination when the handoff session is over can may be implemented by identifying segments of validated packets from the rising satellite or/and identifying time window based on the satellite location. The system of claim 8 wherein the said arbitrator can control the rate it is outputting packets from its internal memory to the network interface;

According to some embodiments of the present invention the output rate of the arbitrator to the network can be adjusted to perform a linear regulation of the output packet rate, according to the measured delay between packets arriving from setting satellite to packets arriving from rising satellite.

According to some embodiments of the present invention the output rate from the arbitrator internal memory to the network interface is always constant and matches the nominal link rate, or the nominal link rate plus some small delta.

According to some embodiments of the present invention buffer is acting as an elastic buffer to automatically adjust between the variable input rate from setting satellite and/or rising satellite to the constant output rate.

According to some embodiments of the present invention the elastic buffer can be implemented in one of the following places in the receiver chain: I/Q output of demodulator part, BBFrame output of decoder part, TS output of decoder part, communication protocol packets at the output of de-encapsulation part According to some embodiments of the present invention the delay in packet arrival delay at the modulator is known and can be calculated.

According to some embodiments of the present invention where in case packet arrival delay at the modulator cannot be calculated it is assigned a maximum value.

According to some embodiments of the present invention, the system is using only one antenna and the delay is performed in the transmitter, the receiving antenna has fast switching time between the setting and the rising satellite. The switching is triggered by loss of lock of the receiver or time schedule calculated according to the location and accurate time source.

What is claimed is:

1. A system for handling handover of satellite communication between a gateway and a terminal from a setting satellite transponder to a rising satellite transponder, said system comprising:
    a transmitter associated with said gateway;
    a packet tagging module comprised within the transmitter, configured to tag packets of the satellite communication with serial numbers;
    a modulator, comprised within the transmitter, configured to modulate the tagged packets;
    a receiver associated with said terminal;
    at least one demodulator comprised within the receiver, configured to demodulate the modulated, tagged packets;
    a buffer, comprised within the receiver, configured to buffer the incoming tagged packets;
    an arbitrator, comprised within the receiver, configured to track the tagged packets' serial number and synchronize the packets received from the two transponders; and
    wherein the arbitrator is further configured to emit the packets to a network interface in a correct order according to the serial number, to obtain a seamless handover, avoid packet loss and prevent packet duplication,
    wherein said buffer can be implemented in one of the following places in the receiver chain: In-phase/Quadrature (I/Q) output of the demodulator, Base Band Frame (BBFrame) output of a decoder, Transport Stream (TS) output of a decoder, communication protocol packets at the output of the de-encapsulator, and in the arbitrator,
    wherein said receiver further comprises at least two demodulators and wherein one demodulator is associated with the reception path of the rising satellite, and another demodulator is associated with the reception path of the setting satellite, and wherein each of said demodulators is associated with a buffer memory, and
    wherein in case the rising satellite has a longer path than that of the setting satellite, the arbitrator is programmed to synchronize the handover between the two satellite transponders by applying the steps of:
        stopping reception of packets from the setting satellite, receiving packets only from the rising satellite;
        remembering the serial number sequential value of the last packet received from the setting satellite transponder; and
        waiting until the serial number's sequential value of the packet of the rising satellite transponder reaches the said remembered last serial number sequential value.

2. The system of claim 1, wherein the transmitter comprises at least one packet encapsulator configured to encapsulate communication protocol packets and wherein the packet tagging module is configured to insert said serial number in the encapsulated packet header, and wherein the receiver comprises at least one de-encapsulator configured to extract the communication protocol packets from their encapsulation.

3. The system of claim 2, wherein said packet encapsulator is a Generic Stream Encapsulation (GSE) module, configured to encapsulate communication protocol packets and comprise GSE packets therefrom.

4. The system of claim 3, wherein the packet tagging module is configured to insert said serial number in the GSE packet.

5. The system of claim 4, wherein the packet tagging module is configured to insert said serial number in the GSE packet header.

6. The system of claim 5, wherein the packet tagging module is configured to insert said serial number in the GSE packet header at a timestamp field.

7. The system of claim 4, wherein the packet tagging module is configured to add said serial number in the GSE packet payload.

8. The system of claim 4, wherein the packet tagging module is configured to insert said serial number in the GSE packet trailer.

9. The system of claim 1, wherein the output rate of the packets from the buffer to the network interface can be adjusted to perform a linear regulation of the output packet rate, according to the measured delay between packets arriving from the setting satellite to packets arriving from the rising satellite.

10. The system of claim 1, wherein the buffer is configured to act as an elastic buffer to automatically adjust between the variable input rate from setting satellite and/or rising satellite to a constant output rate.

11. The system of claim 1, wherein in case the rising satellite has a shorter delay path than that of the setting satellite, the arbitrator is programmed to synchronize the handover between the two satellite transponders by applying the steps of:
 delaying packets received from the rising satellite, by buffering them at the buffer memory of the rising satellite's demodulator, until the rising satellite's packets' serial number is smaller by one than the last packet serial number sequential value received from the setting satellite;
 retrieving the packets of the rising satellite from the buffer of the rising satellite demodulator; and
 stopping reception of packets from the setting satellite, receiving packets only from the rising satellite.

12. The system of claim 1, wherein said packet tagging module is configured to tag the satellite communication packets by inserting said serial number in the packets of the transport layer protocol conveying said satellite communication.

13. The system of claim 1, wherein said packet tagging module is configured to tag the satellite communication packets by inserting said serial number in the frames of the data layer protocol conveying said satellite communication packets.

14. The system of claim 1, wherein said packet tagging module is configured to insert said serial number in the Baseband Frame DVB-S2-BB header.

15. A method for handling handover of satellite communication between a transmitter associated with a gateway and a receiver associated with a terminal, from a setting satellite transponder to a rising satellite transponder, comprising the steps of:
 tagging satellite communication packets with serial numbers on the transmitter side;
 modulating the tagged packets on the transmitter side;
 demodulating the modulated, tagged packets on the receiver side;
 buffering the incoming tagged packets on the receiver side;
 tracking the tagged packets' serial number on the receiver side;
 synchronizing between the packets received from both transponders; and
 emitting the packets to a network interface in a correct order according to the serial number, avoiding packet loss and preventing packet duplication, thus obtaining a seamless handover,
 wherein said buffer can be implemented in one of the following places in the receiver chain: In-phase/Quadrature (I/Q) output of the demodulator, Base Band Frame (BBFrame) output of a decoder, Transport Stream (TS) output of a decoder, communication protocol packets at the output of the de-encapsulator, and in the arbitrator,
 wherein said receiver further comprises at least two demodulators and wherein one demodulator is associated with the reception path of the rising satellite, and another demodulator is associated with the reception path of the setting satellite, and wherein each of said demodulators is associated with a buffer memory, and wherein in case the rising satellite has a longer path than that of the setting satellite, the said synchronization is obtained by applying the steps of:
 stopping reception of packets from the setting satellite on the receiver side, receiving baseband frames only from the rising satellite;
 remembering the serial number sequential value of the last packet received from the setting satellite transponder; and
 waiting until the serial number sequential value of the packet of the rising satellite transponder reaches the said remembered last serial number sequential value.

16. The method of claim 15, wherein in case the rising satellite has a shorter delay path than that of the setting satellite, the said synchronization is obtained by applying the steps of:
 delaying satellite communication packets received from the rising satellite, by buffering them until the rising satellite's packet serial number sequential value is smaller by one than the last packet serial number sequential value received from the setting satellite;
 retrieving the baseband frames from the buffer of the rising satellite; and
 stopping reception of baseband frames from the setting satellite, and receiving baseband frames only from the rising satellite.

17. The method of claim 15, wherein said tagging of satellite communication packets is done by inserting said serial number in the
 packets of the transport layer protocol conveying the said satellite communication.

18. The method of claim 17, wherein said packet tagging is done by inserting said serial number in the Baseband Frame DVB-S2-BB header.

19. The method of claim 15, wherein said packet tagging is done by inserting said serial number in the frames of the data layer protocol conveying said satellite communication packets.

20. The method of claim 15, further comprising the steps of:
 encapsulating communication protocol packets at the transmitter side;
 inserting said serial number in the encapsulated packet at the transmitter side; and
 extracting the communication protocol packets from their encapsulation by a de-encapsulator at the receiver side.

21. The method claim 20, wherein said packet encapsulation is Generic Stream Encapsulation (GSE), and wherein the method comprises the steps of:
 encapsulating communication protocol packets, comprising GSE packets from said communication protocol packets; and
 inserting said serial numbers into the GSE packet.

22. The method claim 21, wherein the said serial number is inserted in the GSE header.

23. The method claim 22, wherein the said serial number is inserted in the GSE header at a timestamp field.

24. The method claim 21, wherein said serial number is inserted in the GSE packet payload.

25. The method claim 21, wherein said serial number is inserted in the GSE packet trailer.

26. The method claim 15, further comprising the steps of:
 measuring the delay between packets arriving from the satellite transponders; and adjusting the output rate of the packets from the receiver to the network interface, to obtain linear regulation of the output packet rate, according to the said measured delay.

27. The method claim 15, wherein the output of the receiver is configured to act as an elastic buffer, and automatically adjust between the variable input rate from the setting satellite or rising satellite to a constant output rate.

* * * * *